United States Patent [19]

Poisel et al.

[11] Patent Number: 5,129,018
[45] Date of Patent: Jul. 7, 1992

[54] LIGHT MIXING DEVICE

[75] Inventors: Hans Poisel, Dachau; Martina Schreiber; Gert Trommer, both of München, all of Fed. Rep. of Germany

[73] Assignee: Messerschmitt-Bölkow-Blohm GmbH, Fed. Rep. of Germany

[21] Appl. No.: 682,316

[22] Filed: Apr. 9, 1991

[30] Foreign Application Priority Data

Apr. 21, 1990 [DE] Fed. Rep. of Germany ....... 4012730

[51] Int. Cl.⁵ ............................................. G02B 5/172
[52] U.S. Cl. ..................................................... 385/16
[58] Field of Search ........................... 350/96.15–96.16

[56] References Cited

U.S. PATENT DOCUMENTS

| 4,198,118 | 4/1980 | Porter | 350/96.16 |
| 4,484,794 | 11/1984 | Witte | 350/96.16 |
| 4,590,619 | 5/1986 | Winzer | 350/96.16 X |
| 4,653,845 | 3/1987 | Tremblay et al. | 350/96.16 |
| 4,915,469 | 4/1990 | Byron et al. | 350/96.16 |

Primary Examiner—Akm E. Ullah
Attorney, Agent, or Firm—Evenson, Wands, Edwards, Lenahan & McKeown

[57] ABSTRACT

The light mixing device for the uniform spectral and intensity-related distribution of light coming in from n×n optical fibers to n×n outgoing optical fibers. The incoming and the outgoing optical fibers are distributed into n groups of n each respectively, each group of optical fibers being optically connected with a first front face of a mixer lamina. The n mixer laminae of the incoming optical fibers are stacked and arranged to form a first stack, and the n mixer laminae of the outgoing optical fibers are stacked and arranged to form a second stack, in each case congruently and above one another in such a manner that the free second front faces of the mixer laminae of both stacks form one surface respectively. The surfaces of both stacks are directed against one another and arranged in a manner in which they are rotated by 90° with respect to one another, and are subsequently optically connected with one another.

5 Claims, 2 Drawing Sheets

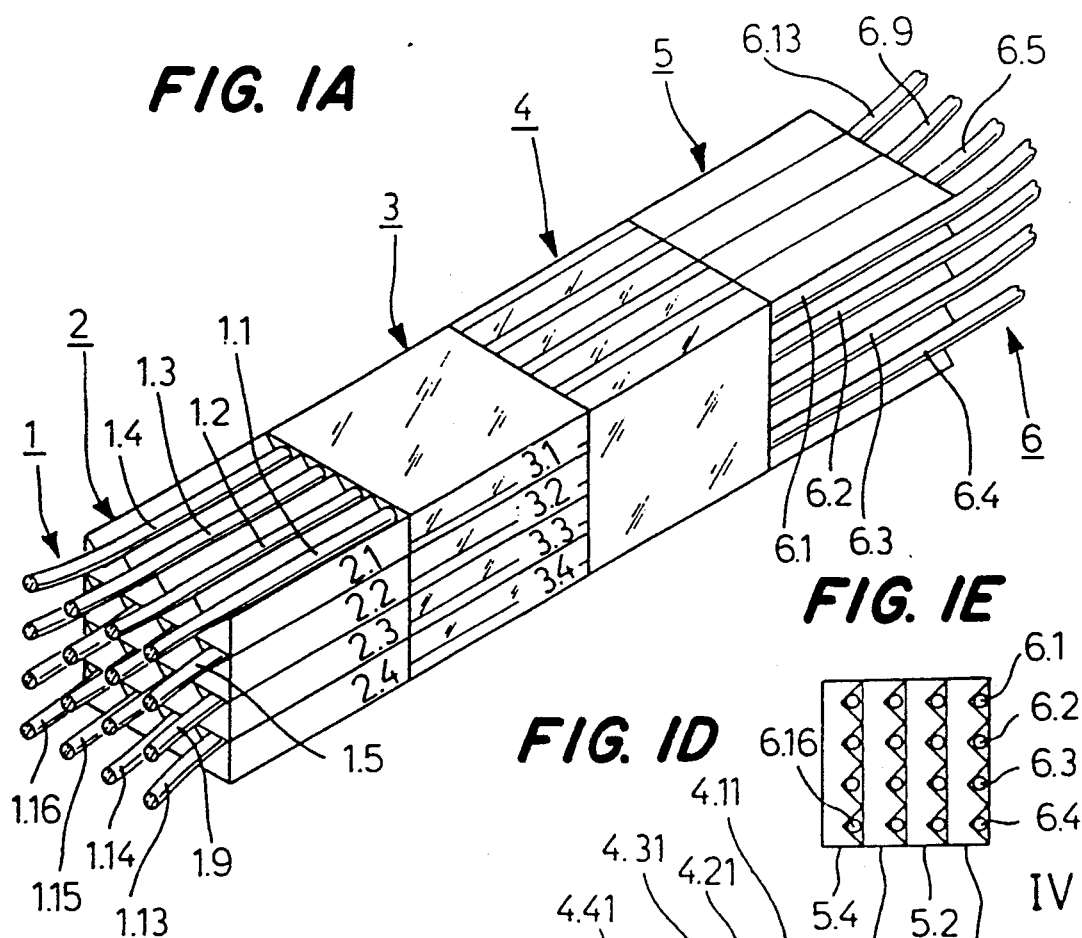

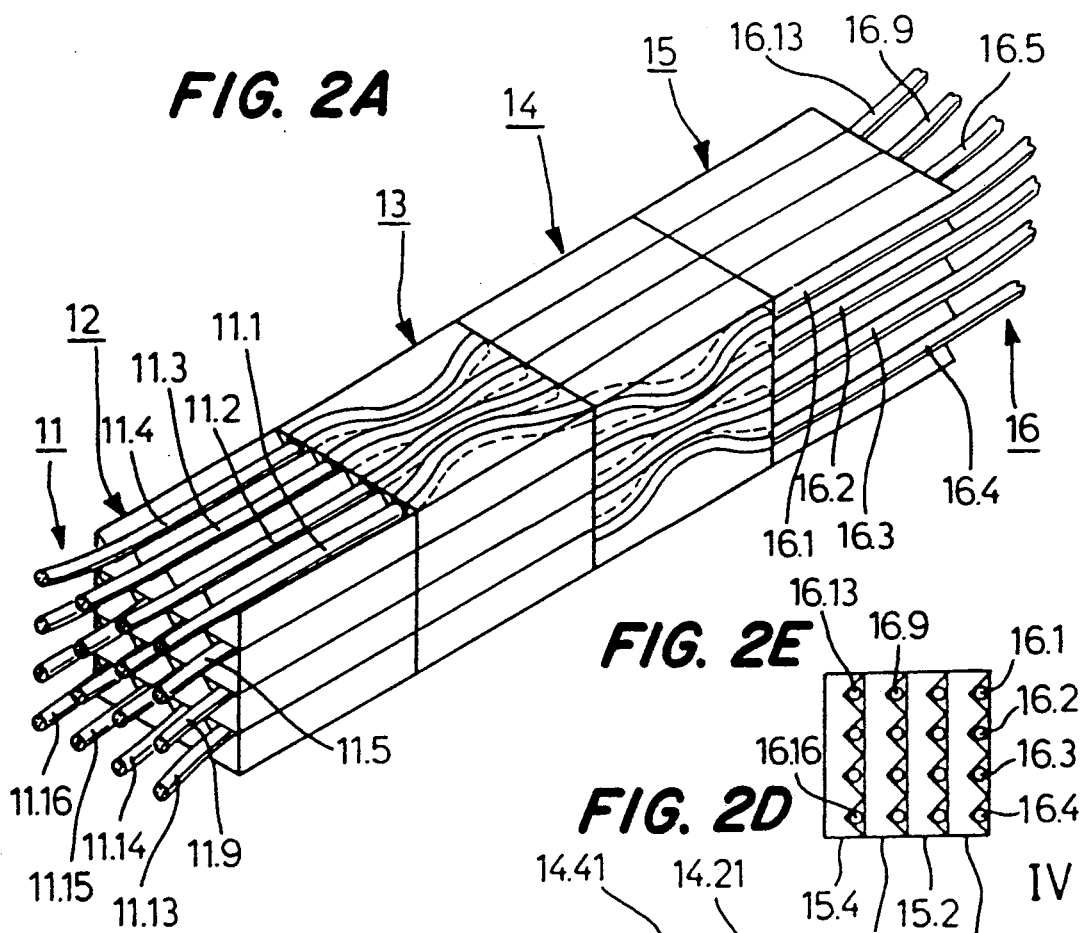
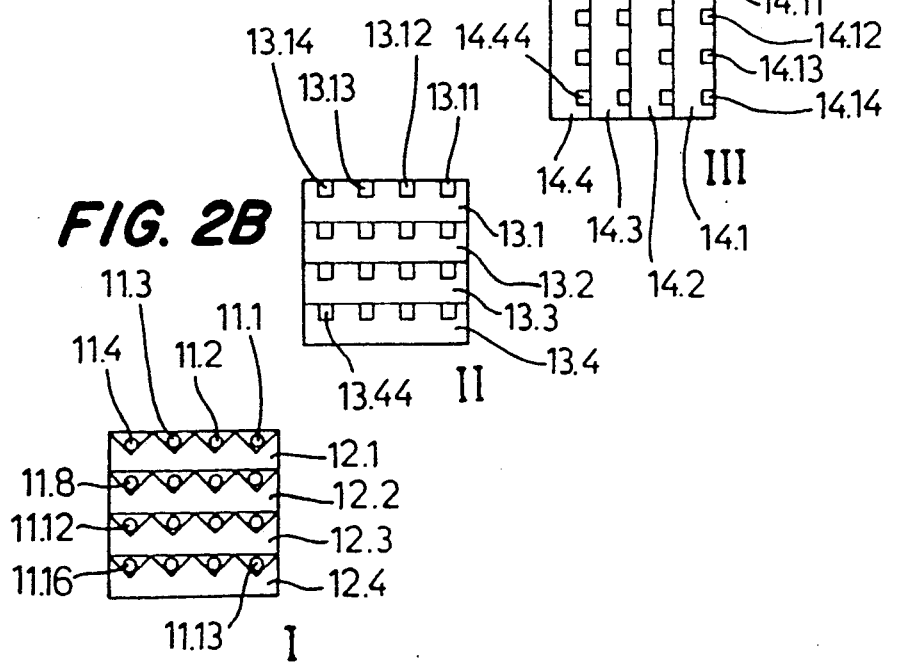

LIGHT MIXING DEVICE

BACKGROUND AND SUMMARY OF THE INVENTION

The invention relates to a light mixing device for the uniform spectral and intensity-related distribution of light coming in from an n×n array of optical fibers to an n×n array of outgoing optical fibers.

A light mixing device of this type is required, for example, for a laser warning sensor, the individual "eye" of which consists of a matrix of optical fibers "looking" into different spatial directions. In such devices, the light that is received in this "eye" from the observed space angle is to be distributed to different spectral regions. The distribution of the received light required for this purpose assumes that the complete information, that is, the contributions of each optical fiber, is present in each spectral region.

European Patent Document EP 0 241 171 As, discloses an optical coupler of the n×n type which comprises a plurality of 2×2 couplers arranged in cascade. Although this type of a coupler basically meets the above-mentioned requirements, expenditures increase if more than only four incoming or outgoing optical fibers are to be coupled with one another, as described in the embodiments of the European Patent Document EP 0 241 171 A2.

It is therefore an object of the present invention to provide a light mixing device of the above-mentioned type which has a significantly simpler and clearer construction. This object is achieved by means of a light mixing device constructed according to the present invention, in which mixer laminae, are used to widen the light beam emerging from a light source with a small diameter and beaming cone (such as in this case, the light emerging from an optical fiber), and to distribute it uniformly onto a larger radiating surface. A first stack of such mixer laminae is connected with the incoming optical fibers. A second stack of mixer laminae, on the other hand, is operated in the "reverse" manner, with light coupled from the mixer laminae into the outgoing optical fibers. The output from the first stack is coupled to the input of the second stack, with the latter stack being rotated by 90° relative to the first stack.

Instead of a mixer lamina, an integrated-optical coupler of the N×N type may also be used, the name "N×N" being characteristic of the number of incoming and outgoing light channels. Such an integrated-optical coupler is essentially flat and comprises N-incoming and N-outgoing light guiding ducts on two opposite sides. By means of a number N of such couplers, which are placed on one another to form a stack, a matrix of $N^2$ light guiding ducts will then be obtained. As mentioned above, two such stacks are then directed against one another and, turned by 90° with respect to one another, are optically connected with one another.

Other objects, advantages and novel features of the present invention will become apparent from the following detailed description of the invention when considered in conjunction with the accompanying drawings.

BRIEF DESCRIPTION OF THE DRAWING

FIGS. 1A-E are a view of a light mixing device for 4×4 optical fibers using mixer laminae; and FIGS. 2A-E are a view of a light mixing device for 4×4 optical fibers using integrated-optical couplers.

DETAILED DESCRIPTION OF THE DRAWINGS

In the embodiment illustrated in FIG. 1, 16 optical fibers 1.1 to 1.16 are arranged in four groups of 4 each. With each group, the optical fibers (for example, 1.1 t 1.4) extend in parallel at equal distances next to one another, the individual groups being arranged such that the front faces of the optical fibers 1.1 -1.16 are situated within a plane, and are arranged in a square grid. For this purpose, each group of optical fibers (for example, 1.1 to 1.4) is placed in one of four V-shaped grooves of a carrier plate (such as 2.1) and is fixed there. Four carrier plates 2.1 to 2.4 of this type are then congruently placed on one another to form a stack 2 and are also fixed. The dimensions of the carrier plates is such that the distances between the two V-shaped grooves situated next to one another corresponds to the distances between two grooves disposed above one another.

Stack 2 is connected on its front end (bearing the planar array of the front faces of optical fibers 1.1-1.16) with a stack 3 of mixer laminae 3.11 to 3.41 in such a manner that each group of optical fibers (for example 1.1 to 1.4) on the front side abuts against the narrow edge of a mixer lamina (for example, 3.11). For this purpose, stack 3 comprises an arrangement of mixer laminae 3.11 made of glass and of spacer pieces 3.12. A similar stack 4 mixer laminae and spacer pieces is coupled to the end of the stack 3 opposite the optical fibers 1. However, stack 4, in its layering, is rotated by 90° with respect to stack 3. In an advantageous embodiment, the thickness of the mixer laminae 3.1-3.4, 4.11-4.41 is made approximately equal to the core diameter of the optical fibers 1.1-1.16, 6.1-6.16.

To the output-side front face of the stack 4, analogous to the connection between stack 2 and 3, another stack 5 is then coupled which consists of optical fibers 6.1 to 6.16 which, in the shape of a matrix, are arranged in carrier plates 5.1 to 5.4.

When the ratio of the length to the width of a mixer lamina is at least 10, the light input from each of the optical fibers coupled thereto is uniformly distributed over the mixer's end opposite the input fibers. Thus with the 90° rotation of the laminae in stack 4 relative to stack 2, it is apparent that the light input from each of the input 1.1-1.16 is uniformly distributed by mixer laminae 3.1-3.4 to all mixer laminae 4.11 to 4.41, after which the proportional light from a mixer lamina of the stack 4 (for example 4.11) is distributed uniformly to the respective assigned group (for example 4.11) is distributed uniformly to the respective assigned group (for example, 5.1) of the outgoing optical fibers (for example 6.1 to 6.4). As a result, each of the outgoing optical fibers 6.1 to 6.16 contains the same proportion of the light coupled in by way of one of the incoming optical fibers 1.1 to 1.16.

In the embodiment shown in FIG. 2, the arrangements of the optical fiber stacks 12 and 15 are essentially identical to stacks 2 and 5 according to FIG. 1. However, in this embodiment stacks 13 and 14 consist of homogeneous integrated-optical 4×4 couplers 13.1 to 13.4 and 14.1 to 14.4 which are arranged above one another and next to one another. Couplers of this type are described, for example, in "Laser- und Optoelectronik" (Laser and Opteoelectronics), 21(1)/1989, Page 59. The two stacks of four 4×4 couplers 13 and 14 respectively are, analogous to the mixer lamina stack 3 and 4 according to FIG. 1, rotated by 90° and coupled to one another such that the output of the stack 13 are aligned with the inputs of the stack 14. The optical fiber stacks 12 and 15 must now be dimensioned such that the distances of the individual optical fibers coincide precisely with the distances of the light-guiding channels inside the respectively assigned coupler stack 13 and 14. The coupling of optical fiber stack 12 to coupler stack 13 and of optical fiber stack 15 to coupler stack 14 must be carried out correspondingly carefully.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A light mixing device for the uniform distribution of light coming in from a set of $n \times n$ input optical fibers, to a set of $n \times n$ output optical fibers, wherein the input and output optical fibers are each arranged into n groups of n each, comprising:

a first stack of n discrete light mixer laminae, each of said mixer laminae having an input face and an output face, said mixer laminae being stacked congruently adjacent one another in such a manner that the respective output faces thereof form a single surface at an output end of said stack, fibers of each of said n groups of input optical fibers being arranged adjacent once another and each of said groups being coupled respectively to the input face of a different one of said mixer laminae in said first stack; and a second stack of n discrete light mixer lamina, each of said mixer laminae having an input face and an output face, said mixer laminae being stacked congruently adjacent one another in such a manner that the respective input faces thereof form a single surface at an input end of said stack, fibers of each of said n groups of output optical fibers being arranged adjacent one another and each of said groups being coupled respectively to the output face of a different one of said mixer laminae in said second stack;

the output end of said first stack being directed against the input end of said second stack in such a manner that the output faces of the mixer laminae in said first stack are optically coupled to the input faces of the mixer laminae in said second stack, with the mixer laminae in said second stack being rotated 90° relative to the mixer laminae in said first stack.

2. A light mixing device according to claim 1, wherein the thickness of a mixer lamina is approximately equal to a core diameter of said optical fibers, and the ratio of length and width of a mixer lamina is approximately 10 to 1 or larger.

3. A light mixing device according to claim 1, wherein the optical fibers of a group are arranged in parallel V-shaped grooves of a carrier plate.

4. A light mixing device according to claim 2, wherein the optical fibers of a group are arranged in parallel V-shaped grooves of a carrier plate.

5. A light mixing device according to claim 1, said mixer laminae comprise integrated-optical $N \times N$ couplers.

* * * * *